J. B. DAVIS.
VALVE.
APPLICATION FILED FEB. 28, 1918.

1,277,297.

Patented Aug. 27, 1918.

WITNESSES:
W. C. Ross.

INVENTOR.
John B. Davis.
BY Chapm + Neal.
ATTORNEYS.

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

VALVE.

1,277,297.   Specification of Letters Patent.   Patented Aug. 27, 1918.

Application filed February 28, 1918. Serial No. 219,613.

*To all whom it may concern:*

Be it known that I, JOHN B. DAVIS, a citizen of the United States of America, and residing at Springfield, in the county of Hampden and State of Massachusetts, have invented certain new and useful Improvements in Valves, of which the following is a specification.

This invention relates to valves and more particularly to quick acting stop valves, such as are suitable for emergency use to afford quick interruption of flow.

The invention, although capable of general application, finds one advantageous use with the delivery hose of oil pumps, such as are commonly used to dispense gasolene to automobiles and the like. Frequently, the delivery of a definite quantity of gasolene, as ordered by the driver, will cause the tank of the automobile to overflow and a consequent wastage of fuel results. The valve of the present invention may be applied to the end of the pump hose to permit the driver to promptly stop the flow of gasolene in case of impending overflow and prevent waste of the fuel.

The object of the invention is to provide a valve which may be quickly actuated, as with a free sliding movement under the exertion of a relatively small force, and which may be made substantially proof against leakage by means that do not restrict the freedom of movement and quick actuation of the valve.

Other objects and advantages will appear in the following description and in the appended claims.

Figure 1:
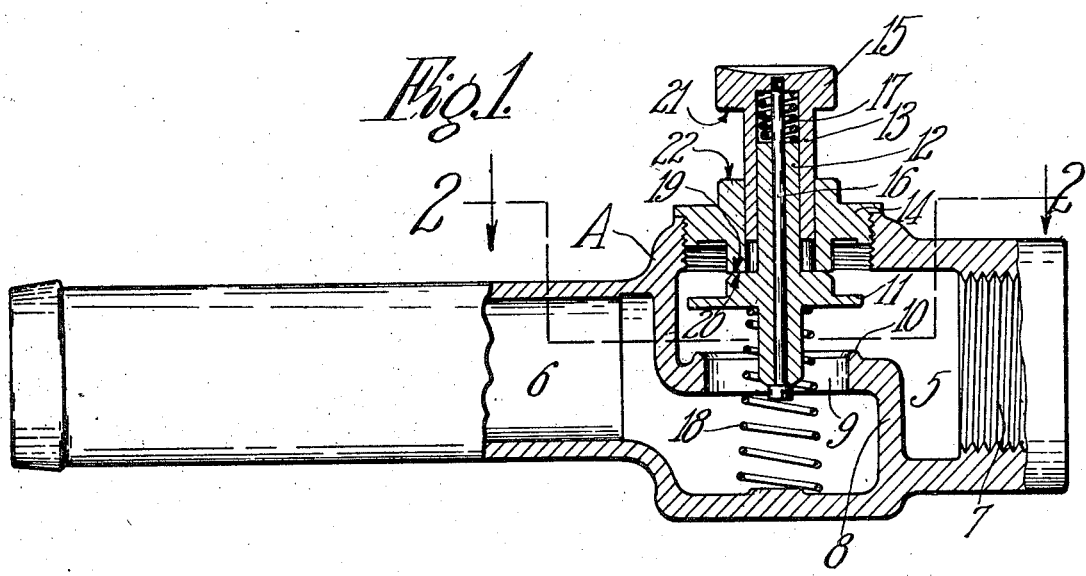
Figure 2:
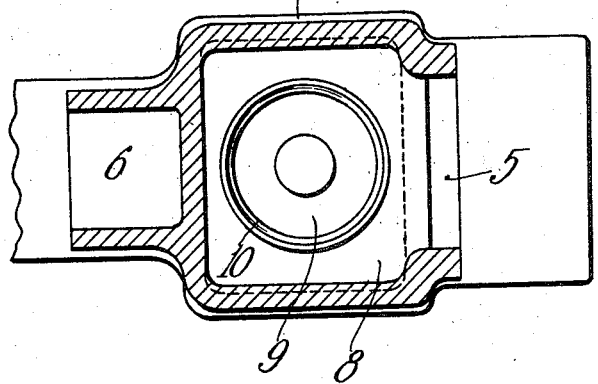

The invention, in an embodiment at present preferred, is shown for illustrative purposes in the accompanying drawings, in which:

Figure 1 is an elevational view, partly in section, of a valve embodying the invention; and Fig. 2 is a fragmentary sectional plan view taken on the line 2—2 of Fig. 1, showing the valve casing only.

Referring to these drawings in detail, A represents the valve casing, which is provided with inlet and outlet passages 5 and 6, respectively. The casing A may be of any desired form and in the drawings has been shown, merely by way of illustrative example, as adapted for use on the delivery end of a hose, such as the flexible filling hose of a gasolene dispensing station. Thus, casing A may be provided with a suitable interiorly threaded portion 7 adjacent the inlet end of the casing, which portion is adapted for connection with a hose of the type mentioned, and the other end of the casing may be made relatively long and in the form of a nozzle for convenient insertion in the filling opening of the gasolene tank of an automobile. The present invention, however, is largely independent of the form of the casing, and the form shown, although preferred for the specific use of the invention described, is not essential even to such use.

The inlet and outlet passages 5 and 6, respectively, are separated by a partition wall 8 of the shape clearly shown in Fig. 1. The central portion of partition 8 is arranged substantially diametrically of the casing and is provided with an opening 9 therethrough to afford communication between passages 5 and 6. Surrounding opening 9 is a raised valve seat 10 upon which a valve 11 is adapted to seat and interrupt communication between the passages 5 and 6. Integral with valve 11 or otherwise fixed thereto is a stem 12, the upper end of which is telescoped within the lower end of a sleeve 13. The latter is slidably mounted in a removable cap portion 14 of casing A and constitutes the valve operating plunger, the upper end of the sleeve being closed by a member 15, which constitutes a finger piece for convenient manual actuation of sleeve 13.

The sleeve 13 and stem 12 are connected by a screw 16 which passes axially upward through the stem and threads into the under face of finger piece 15. The screw 16 limits the degree of axial separation of stem 12 and sleeve 13 and permits them to be axially moved together through a limited range for a useful purpose which will later appear. A spring 17 housed within the upper end of sleeve 13 acts between the finger piece 15 and the upper end face of stem 12 to separate the latter and sleeve 13 to the limit controlled by the abutment of the head of screw 16 with the lower end face of stem 12. A second spring 18, of less strength and more readily compressible than spring 17, acts between the wall of casing A and the lower face of valve 11 to normally hold the latter in the raised position illustrated.

The sleeve 13, as has been described, is slidable in cap 14, and it is to be noted that, with a sliding fit between the cap and sleeve, leakage of fluid between these elements will result unless means, such as the well-known stuffing box, for example, are provided to form a tight joint between the sleeve and cap. The stuffing box is undesirable for the present purposes, not only on account of its expense, but also for the reason that the tight joint afforded by the stuffing box, although effective to prevent leakage, necessarily restricts the free sliding of the sleeve 13. It is important that the latter slide freely under the application of a slight force for the valve is adapted to be manually actuated merely by the pressure of the thumb on the finger piece. Furthermore, it is essential that the stem be quickly slidable to seat the valve, in order that the latter be serviceable for its intended use as an emergency closure.

To prevent leakage of fluid between sleeve 13 and cap 14, when the valve 11 is in raised position as illustrated, the lower face of the cap 14 is provided with a carefully ground flat surface 19, and on the upper face of valve 11 is a like surface 20. The spring 18 presses the latter into intimate contact with the surface 19 to afford a tight closure. When valve 11 engages seat 10, the lower face of finger piece 15, which is ground, as at 21, may be pressed into close relation with the ground upper face 22 of cap 14, in a manner to be described. Thus, a tight closure is provided to prevent leakage between the sleeve 13 and cap 14, when valve 11 is in either of its extreme positions, and the valve never remains in an intermediate position but is moved rapidly from one to the other of its extreme positions.

In order for the coacting surfaces 19 and 20 and the like surfaces 21 and 22 to be effective to prevent leakage, it is essential that they may be forced very closely together. No difficulty is obtained in thus engaging the surfaces 19 and 20 for there is nothing but the surface 19 to restrict upward movement of the valve. As to the surfaces 21 and 22, however, the problem is different, for if the sleeve 13 and stem 12 move in unison, their downward movement would be restricted either by valve 11 coming into contact with its seat or by the surface 21, and unless the vertical distance between the surfaces 21 and 22 is precisely equal to that between the under face of valve 11 and the upper face of seat 10, there will either be leakage past the valve or between the surfaces 21 and 22. It will be appreciated that extremely accurate measurement and precision work would be required to cause the valve 11 and surface 21 to seat simultaneously, if the stem 12 and sleeve 13 were rigidly connected. Moreover, if such result were originally obtained, it might not be thereafter maintained for unequal wear on seats 10 and 22 would soon render the valve 11 or finger piece 15 ineffective for the purposes desired. To avoid the necessity for precision work, the sleeve 13 and stem 12 are made capable of relative movement to permit the accurate seating of both the valve 11 and finger piece 15 as will appear from the consideration of the operation of the valve.

Assume, for example, that the valve casing is employed on the delivery end of the flexible hose of a gasolene dispensing station for filling the tank of an automobile. The operator of the automobile commonly guesses at the quantity necessary to fill his tank and instructs the station operator to pump a definite quantity. Now quite commonly the quantity ordered may be more than necessary, and the tank may be overflowed and gasolene wasted by the station operator, who is usually not in position to observe the tank. The automobile owner, however, usually stands close by the tank and, in case of overflow or impending overflow, promptly presses the finger piece 15 to stop delivery.

As the finger piece is pressed down, the spring 17 being stronger than spring 18 is not compressed and the stem 12 and sleeve 13 move, as if fixed together, to seat valve 11. However, it is doubtful if, as a practical manufacturing proposition, the finger piece 15 could be made to seat exactly simultaneously with valve 10, so the construction adopted is such that the valve 11 will seat first, leaving a slight distance between the surfaces 21 and 22. After valve 11 has been seated, continued pressure on finger piece 15 will compress spring 17 and move sleeve 13 downwardly on stem 12 to cause the intimately close and leak tight engagement of surfaces 21 and 22 desired.

The invention has been disclosed herein for illustrative purposes, and the scope of the invention is defined by the appended claims rather than by the foregoing description.

What I claim is—

1. In a device of the class described, a casing, spaced and slidably mounted members disposed one inside and one outside the casing, one of said members having a part extending through the casing, a seat on the exterior of the casing encompassing said part and adapted to be engaged by the outside member, a seat within the casing adapted to be engaged by the inside member, and means connecting said members so that an actuation of one will cause an actuation of the other, said means arranged to permit relative movement between the members after one thereof has been moved into engagement with its seat to permit close engagement between the other member and its seat.

2. In a device of the class described, a casing having inlet and outlet passages and an opening connecting said passages, a valve in the casing to close said opening, a valve actuating member extending outside the casing and slidably mounted therein, a part on said member adapted to seat on the casing when the valve is in closed position to prevent leakage between the member and casing, and means to permit relative movement between said valve and member after the former has been moved into position to close said opening, whereby said part may be tightly pressed against its seat on the casing.

3. In a device of the class described, a casing having inlet and outlet passages and an opening connecting said passages, a valve in the casing to close said opening, a valve actuating member extending outside the casing and slidably mounted therein, seats provided on the exterior and interior of the casing adjacent said member, a part on said valve adapted for engagement with the interior seat, means yieldingly holding said valve in open position and said part against its seat, a part on said member adapted for engagement with the exterior seat when the valve is in closed position, and means to permit relative movement between the valve and member after the former has been moved into position to close said opening, whereby the last-named part may be tightly pressed against its seat on the casing, all constructed and arranged so that leakage between the member and casing is prevented when the valve is in either open or closed position.

4. In a device of the class described, a casing having inlet and outlet passages and an opening connecting said passages, a valve adapted to close said opening, a spring to yieldingly hold the valve away from the opening, a quick-acting plunger slidable in the casing and operable to seat said valve, a spring stronger than the first-named spring and arranged between the valve and plunger, and a part on the latter adapted to seat on the casing when the valve is in position to close said opening, and means for limiting the movement of the plunger relatively to the valve by the last named spring, all constructed and arranged so that the plunger may be moved and the second spring compressed after the valve has been seated to permit said part to be tightly pressed against the casing.

5. A quick acting stop valve, comprising, a casing having inlet and outlet passages, a valve to control the communication between said passages, a quick acting plunger slidable in the casing, a stem provided on the valve and telescoped within the plunger, a spring in the plunger between the latter and said stem, means for limiting the movement of the plunger relatively to the valve by the last named spring, a second spring more readily compressible than the first-named spring and arranged to hold the valve in open position, whereby the plunger may be moved to seat the valve without compressing the first-named spring, and a part on the plunger adapted to seat against the casing and prevent leakage therefrom between the casing and the plunger when the valve is in closed position, said first-named spring arranged to permit relative movement between the plunger and stem as necessary to seat said part.

6. A quick acting stop valve, comprising, a casing having inlet and outlet passages, a valve to control the communication between said passages, a quick acting plunger slidable in the casing, a stem provided on the valve and telescoped within the plunger, a spring in the plunger between the latter and said stem, a second spring more readily compressible than the first-named spring and arranged to hold the valve in open position, whereby the plunger may be moved to seat the valve without compressing the first-named spring, and a part on the plunger adapted to seat against the casing and prevent leakage therefrom between the casing and the plunger when the valve is in closed position, said first-named spring arranged to permit relative movement in one direction between the plunger and stem as necessary to seat said part, and means to limit the relative movement of the plunger and stem in the other direction.

7. In combination, a casing, a valve therein movable between fixed limits from open to closed position, a valve operating member extending through the casing and including relatively movable parts one of which is fixed to the valve, a seat provided on the exterior of the casing adjacent said member and means provided on the other part to engage said seat, the last named part arranged so that it may be moved in one direction relatively to the first named part after the valve has reached the limit of its travel in such direction, whereby the first named part may be pressed tightly against its seat to prevent leakage of fluid from the casing.

8. In combination, a casing, a valve therein movable between fixed limits from one position to another, means yieldingly holding the valve in one position, a valve actuating member movable through the casing to move the valve to its other position, seats provided on the exterior and interior of the casing adjacent said member, means carried by the latter to engage one of said seats when the valve is in one position and the other of said seats when the valve is in its other position, said member including relatively movable parts one of which is fixed to said valve and a yieldable connection between said parts.

JOHN B. DAVIS.